United States Patent [19]
Duprez

[11] Patent Number: 4,502,450
[45] Date of Patent: Mar. 5, 1985

[54] DIESEL FUEL CONTROL VALVE AND SYSTEM

[75] Inventor: Wayne R. Duprez, Waltham, Mass.

[73] Assignee: Standard-Thomson Corporation, Waltham, Mass.

[21] Appl. No.: 527,990

[22] Filed: Aug. 31, 1983

Related U.S. Application Data

[63] Continuation of Ser. No. 303,486, Sep. 18, 1981, Pat. No. 4,452,213, which is a continuation of Ser. No. 57,398, Jul. 13, 1979, abandoned.

[51] Int. Cl.³ ...................... F02M 37/20; B01D 53/22
[52] U.S. Cl. .................................... 123/516; 123/514; 123/557; 137/433
[58] Field of Search ............... 123/510, 557, 511, 518, 123/512, 513, 514, 515-516; 137/433, 192, 193

[56] References Cited

U.S. PATENT DOCUMENTS 1,909,390 5/1933 Ball ...................................... 123/516
2,599,699 6/1952 Dilworth ............................ 123/514
2,998,056 8/1961 Capehart ............................ 137/433
3,472,214 10/1969 Moon ................................. 123/557
3,768,454 10/1973 Markland ........................... 123/557
4,096,879 6/1978 Serur .................................. 137/433
4,205,643 6/1980 Vidal .................................. 123/514
4,279,232 7/1981 Schuster ............................. 123/516
4,452,213 6/1984 Duprez ............................... 123/516
4,454,848 6/1984 Duprez ............................... 123/516

*Primary Examiner*—Charles J. Myhre
*Assistant Examiner*—Carl S. Miller
*Attorney, Agent, or Firm*—Jacox & Meckstroth

[57] ABSTRACT

Fuel control mechanism, particularly adapted for control of diesel fuel flow to a diesel engine. The fuel control mechanism includes a housing provided with a plurality of flow passages therethrough. The fuel control mechanism includes a thermally responsive valve member which controls flow of fuel from a source thereof to the diesel engine and which controls the mixing of fuel from a source thereof with unused fuel which flows from the diesel engine. The fuel control mechanism also includes a valve member which controls flow of gas which flows from the diesel engine with the unused fuel.

6 Claims, 2 Drawing Figures

DIESEL FUEL CONTROL VALVE AND SYSTEM

RELATED APPLICATION

This application is a continuation of application Ser. No. 303,486, filed Sept. 18, 1981 now U.S. Pat. No. 4,452,213 which is a continuation of Ser. No. 057,398, filed July 13, 1979, now abandoned.

BACKGROUND OF THE INVENTION

In most diesel engine systems there is a filter device through which fuel must flow to reach the engine. When the engine apparatus is subjected to temperatures in the region of zero degrees Fahrenheit and lower, there is a tendency for ice crystals and wax to form in the diesel fuel. Such conditions cause clogging of the fuel filter device.

Another problem which exists in a conventional diesel engine apparatus relates to the fact that some of the fuel pumped to the engine is not used and the excess fuel which flows from the engine contains a small quantity of gas which is ordinarily vented from the fuel in the fuel tank as the excess fuel returns to the fuel tank.

Various methods have been employed in an attempt to overcome these problems. For example, the conventional No. 2 diesel fuel oil is mixed with No. 1 fuel oil. This has not been found to be satisfactory and adds to the expense of the fuel. U.S. Pat. Nos. 2,881,828 and 3,472,214 show the use of heat exchanger devices to heat the fuel. However, such devices may not provide heat to the fuel until a significant period of time has elapsed, and therefore fuel filter clogging may occur with initial operation.

U.S. Pat. No. 3,768,454 shows the use of a fuel tank which has a mixing zone with a temperature responsive valve controlling flow of fuel with respect to the mixing zone. Such a system requires a special fuel tank.

It is therefore an object of this invention to provide a diesel fuel control valve and system which provides fuel to a diesel engine at a proper temperature when the diesel engine apparatus is exposed to substantially any outdoor temperature, either cold or warm.

It is another object of this invention to provide such a diesel fuel control valve and system which does not require a special fuel tank.

It is another object of this invention to provide such a diesel engine fuel control valve and system which does not employ a heat exchanger device.

It is another object of this invention to provide such a diesel fuel control valve and system which can be easily and readily installed in an existing diesel engine apparatus.

It is another object of this invention to provide such a diesel engine control valve and system which is relatively small in physical size.

It is another object of this invention to provide such a diesel engine control valve and system by which gas is automatically removed from the liquid fuel.

Other objects and advantages of the diesel fuel control valve and system of this invention reside in the construction and arrangement of parts, the combination thereof, the method of manufacture, and the mode of operation, as will become more apparent from the following description.

BRIEF SUMMARY OF THE INVENTION

This invention comprises a diesel engine fuel control device for use in a diesel system which has a diesel engine provided with a fuel tank and fuel injector means, fuel conduit means for providing fuel to the fuel injector means, and fuel return means for conducting unused fuel from the diesel engine. The fuel control device includes thermally responsive fuel control valve means which controls the mixing of fuel which flows from the diesel engine with fuel flowing from the fuel tank. The fuel control device also includes valve means for venting gas which flows from the diesel engine with the unused fuel so that the gas is not mixed with fuel which flows to the diesel engine.

DETAILED DESCRIPTION OF THE INVENTION

Figure 1:
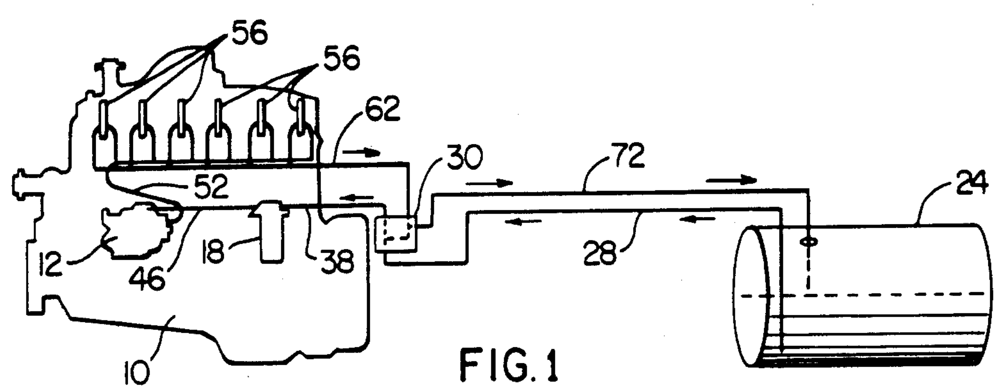
FIG. 1 is a diagrammatic view showing a diesel fuel control valve and system of this invention in combination with a diesel engine apparatus.

FIG. 1 shows a diesel engine 10 provided with a fuel pump 12 and a fuel filter 18. Diesel fuel is supplied to the engine 10 from a fuel tank 24.

A fuel supply conduit 28 extends from the tank 24 to a mixing control valve 30 of this invention. The fuel supply line 28 is joined to an inlet passage 34 within the mixing valve 30. A fuel supply conduit 38 is joined to an outlet passage 42 of the mixing control valve 30 and extends to the fuel filter 18. A conduit 46 extends from the fuel filter 18 to the fuel pump 12, and a conduit 52 extends from the fuel pump 12 to a set of fuel injectors 56 of the engine 10. A conduit 62 leads from the fuel injectors 56 to an inlet passage 66 of the mixing control valve 30. A fuel return conduit 72 is joined to an outlet passage 76 of the mixing control valve 30 and is also joined to the fuel tank 24.

Between the inlet passage 34 and the outlet passage 42 within the mixing control valve 30 is a main passage 80 which is in communication with the inlet passage 34 and the outlet passage 42. Within the main passage 80 is a thermally responsive actuator device 84 which is provided with a container 84*a* and a stem 84*b*. The thermally responsive actuator device 84 is preferably of a type, such as that shown in U.S. Pat. Nos. 2,806,375 and 2,806,376, having the stem 84*b* extending into the container 84*a* and having a quantity of thermally responsive expansible-contractible material within the container 84*a*. The thermally responsive material within the container 84*a* expands significantly in volume when subjected to temperatures above a given predetermined value. Such expansion causes relative movement between the container 84*a* and the stem 84*b*. The stem 84*b* is threadedly adjustably attached to a wall 88 of the mixing control valve 30. Therefore, the position of the container 84*a* with respect to the connecting passage 96 is adjustable by threaded movement of the stem 84*b*. Encompassing the container 84*a* is a spring 90 which engages the container 84*a* and also engages an annular seal member 92 which is positioned within an auxiliary passage 94. The auxiliary passage 94 is in communication with a connecting passage 96. The connecting passage 96 is provided with a valve seat 98 which is within a port 99. The port 99 is in communication with a chamber 100. The chamber 100 is in communication with the inlet passage 66 and the outlet passage 76.

Within the chamber 100 is a float member or buoyant member 104 which has a closure element 106 at least partially within the port 99.

OPERATION

The fuel pump 12 creates negative pressure conditions which cause fuel to flow from the tank 24, through the fuel supply conduit 28, and into the main passage 80 of the mixing control valve 30, through the inlet passage 34 thereof. The fuel then flows through the main passage 80 and outwardly from the mixing control valve 30 through the outlet passage 42. The fuel then flows through the fuel supply conduit 38 through the fuel filter 18, through the conduit 46 to the fuel pump 12, and flows from the fuel pump 12 through the conduit 52 to the fuel injectors 56 of the diesel engine 10. Some of the fuel provides combustion in the diesel engine 10 and some of the fuel flows from the injectors 56 through the conduit 62 to the mixing control valve 30 and into the inlet passage 66 thereof. The fuel then flows into the chamber 100. This fuel has been heated by the diesel engine 10 and has no crystallized wax therein but has entrained gases therein.

The closure element 106 of the float 104 engages the valve seat 98 and closes the port 99 until there is a sufficient volume of fuel within the chamber 100 to cause the float 104 to rise within the chamber 100. Therefore, entrained gases flowing from the engine 10 through the conduit 62 are not permitted to flow into the connecting passage 96. The entrained gases are forced to flow outwardly from the chamber 100, through the outlet passage 76 and then flow to the fuel tank 24 through the fuel return conduit 72. The gases are then vented from the tank 24 through any suitable vent means, not shown.

Figure 2:
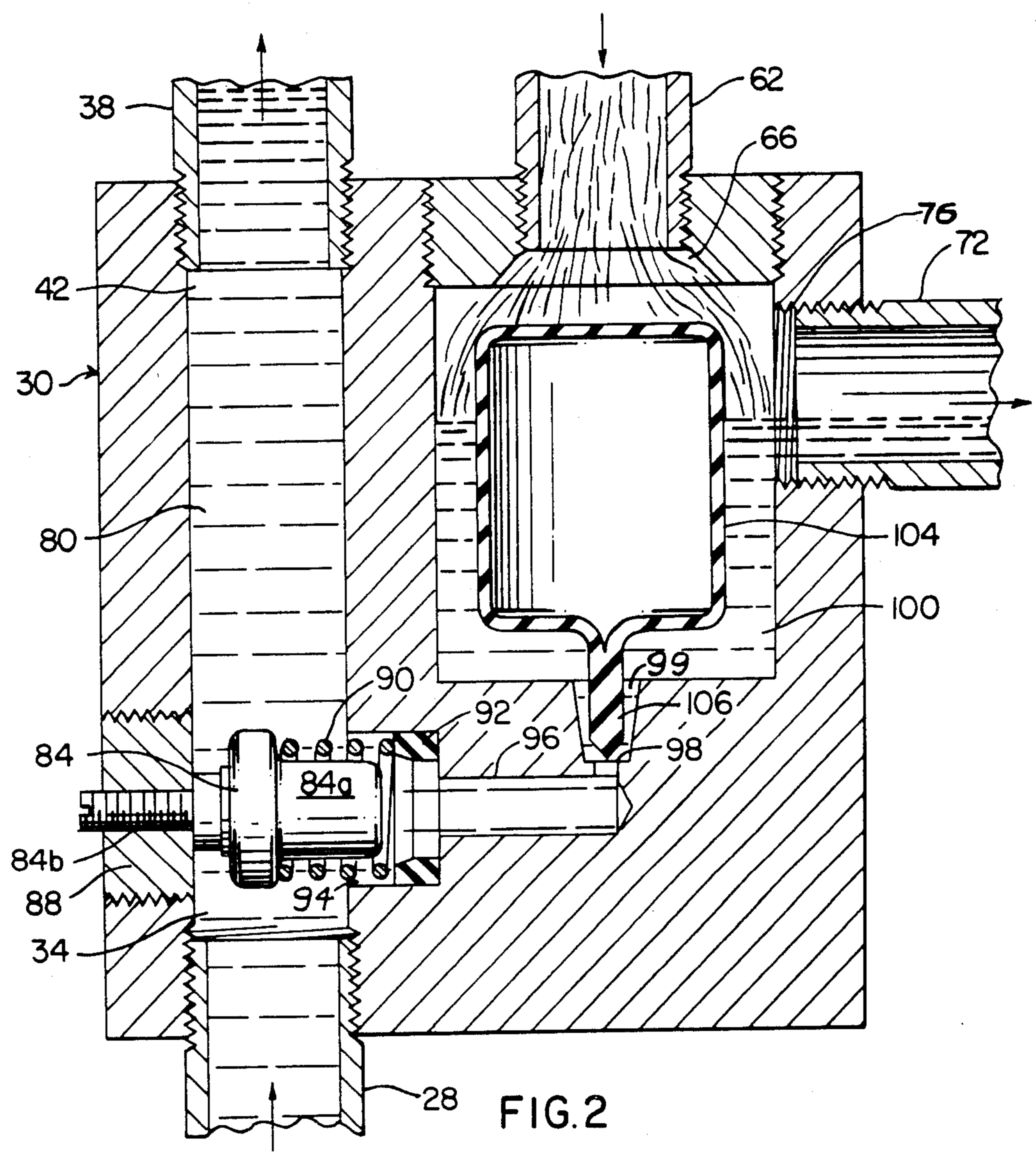
FIG. 2 is a cross-sectional diagrammatic type of view, drawn on a much larger scale than FIG. 1, showing a diesel fuel control valve of this invention in one of the operating modes thereof.

When the float 104 rises in the fuel within the chamber 100 as illustrated in FIG. 2, the closure element 106 is spaced from the valve seat 98. Therefore, heated fuel flows from the chamber 100 through the port 99, through the connecting passage 96 and into the main passage 80. This heated fuel is mixed with fuel flowing into the main passage 80 from the fuel tank 24.

Thus, as operation of the diesel engine 10 is initiated, heated fuel from the engine 10 is mixed with fuel flowing from the tank 24. Therefore, fuel flowing through the filter 18 to the engine 10, has a temperature sufficiently high that there is no crystallization of the wax, and clogging of the filter 18 does not occur.

This mixing action continues until the temperature of the fuel engaging the thermally responsive actuator 84 reaches a predetermined value. When this occurs, the container **84*a* moves in a direction from the stem 84*b* and toward the connecting passage 96. Thus, the volume of the fuel flowing from the chamber 100 to the main passage 80 is gradually reduced, and the portion of the fuel flowing from the tank 24 into the main passage 80 gradually increases. If the temperature of the fuel engaging the thermally responsive actuator 84 increases to a higher predetermined value, (a temperature at which wax crystallization is precluded) the container 84*a* moves into a position to close the connecting passage 96, and no fuel flows from the chamber 100 into the main passage 80. Thus, under these conditions all of the fuel flowing through the main passage 80 to the fuel filter 18 and to the engine 10 is fuel flowing directly from the tank 24**.

When the temperatures to which the thermally responsive actuator device 84 is subjected are reduced to a predetermined value, the thermally responsive material within the container **84*a* reduces in volume, and the spring 90 forces the container 84*a* to move toward the wall 88. Thus, the connecting passage 96 is partially or entirely opened for flow of fuel therethrough to the main passage 80, and mixing of heated fuel with fuel from the tank 24** is resumed.

Thus, it is understood that the diesel fuel control valve and system of this invention provides fuel which has a sufficient temperature to avoid waxing and clogging of the fuel filter 18. Furthermore, the control valve of this invention effectively limits the temperature of fuel flow to the diesel engine, and does not permit flow of gas to the engine.

Although the preferred embodiment of the diesel fuel control valve and system of this invention has been described, it will be understood that within the purview of this invention various changes may be made in the form, details, proportion and arrangement of parts, the combination thereof, and the mode of operation, which generally stated consist in a diesel fuel control valve and system within the scope of the appended claims.

The invention having thus been described, the following is claimed:

1. A diesel fuel control valve device for use in a diesel engine fuel supply system provided with a fuel supply tank, a fuel supply conduit extending from the fuel supply tank to the diesel engine, and a heated fuel and air conduit extending from the diesel engine to the fuel supply tank for conducting from the engine a mixture of heated fuel and air entrained in the heated fuel, said fuel control valve device comprising a valve housing which defines a valve chamber provided with an upper portion and a lower portion, said valve housing also defining a fuel supply passage which extends through said valve housing and which is connected to the fuel supply conduit for directing fuel from the fuel supply tank through said fuel supply passage to the diesel engine, said valve housing further defining a fuel recirculating passage connecting said lower portion of said valve chamber to said fuel supply passage with an annular valve seat forming a fluid flow passage leading to said fuel recirculating passage a buoyant vertically movable within said valve chamber, a closure element connected to said buoyant member and positioned adjacent said annular valve seat for controlling the flow of heated fuel from said valve chamber through said recirculating passage into said fuel supply passage in response to vertical movement of said buoyant member within said valve chamber, said heated fuel and air conduit being connected to said upper portion of said valve chamber and above said buoyant member, the cross-sectional area of said valve chamber with respect to the cross-sectional area of said heated fuel and air conduit being such that all of the mixture of heated fuel and entrained air is directed downwardly within said valve chamber around said valve member while the diesel engine is operating, said buoyant member therefore receiving and sensing the mixture of heated fuel and entrained air flowing downwardly around said buoyant member such that said buoyant member responds to the proportions of heated fuel and air within the mixture while air separates from the mixture for conduction to the fuel supply tank through said heated fuel and air conduit, a thermally responsive valve unit positioned within said valve body at the juncture between said fuel supply passage and said fuel recirculating passage, said thermally responsive valve unit including control means for controlling the flow of heated fuel through said recirculating passage in response to the temperature of the fuel flowing through said fuel supply passage, thus providing a diesel fuel control valve device which is relatively small in physical size and which efficiently uses the return fuel heated by the engine.

2. A fuel control valve device as defined in claim 1 in which the thermally responsive valve unit includes a valve element which is movable within the fuel recirculating passage to control the flow of heated fuel through said fuel recirculating passage.

3. A compact fuel control valve device adapted for use in a diesel engine fuel supply system including a fuel supply tank, a fuel supply conduit extending from the tank to the diesel engine, and a heated fuel and air conduit extending from the engine to the fuel supply tank for conducting from the engine a mixture of heated fuel and air entrained in the heated fuel, said fuel control valve device comprising a valve body defining a valve chamber having an upper portion and a lower portion, said valve body defining a fuel supply passage extending through said valve body and being connected to the fuel supply conduit for directing fuel from the fuel supply tank through said fuel supply passage to the diesel engine, said valve body further defining a fuel recirculating passage connecting said lower portion of said valve chamber to said fuel supply passage, an annular valve seat surrounding said fuel recirculating passage, a buoyant valve member disposed for generally vertical movement within said valve chamber, a closure element connected to said valve member and positioned adjacent said valve seat for controlling the flow of heated fuel from said valve chamber through said recirculating passage into said fuel supply passage in response to vertical movement of said valve member within said valve chamber, said heated fuel and air conduit being connected to said upper portion of said valve chamber, the cross-sectional area of said valve chamber being sufficiently small relative to the cross-sectional area of said heated fuel and air conduit to provide for directing all of the mixture of heated fuel and entrained air around said valve member while the diesel engine is operating, said valve member being positioned to receive and sense the mixture of heated fuel and entrained air flowing around said valve member such that said valve member responds to the proportions of heated fuel and air within the mixture while air separates from the mixture for conduction to the fuel supply tank by said heated fuel and air conduit, a thermally responsive valve unit positioned within said valve body at the junction of said fuel supply passage and said fuel recirculating passage, and said valve unit including means for controlling the flow of heated fuel through said recirculating passage in response to the temperature of the fuel flowing through said fuel supply passage, to provide a compact valve system for efficiently using the return fuel heated by the engine as heated return fuel is quickly blended into the fuel flowing to the diesel engine from the fuel supply tank, the compact fuel control valve device requiring relatively small space adjacent the engine.

4. A compact fuel control valve device adapted for use in a diesel engine fuel supply system including a fuel supply tank, a fuel supply conduit extending from the tank to the diesel engine, and a heated fuel and air conduit extending from the engine to the fuel supply tank for conducting from the engine a mixture of heated fuel and air entrained in the heated fuel, said fuel control valve device comprising a valve body defining a main passage extending directly through the valve body and forming a valve chamber, the main passage having an upper portion and a lower portion, said valve body defining a fuel supply passage extending directly through said valve body and being connected to the fuel supply conduit for directing fuel from the fuel supply tank through said fuel supply passage to the diesel engine, said valve body further defining a fuel recirculating passage connecting said lower portion of said main passage to said fuel supply passage, an annular valve seat surrounding said fuel recirculating passage, a buoyant member disposed for generally vertical movement within said main passage, a closure element connected to said buoyant member and positioned adjacent said valve seat for controlling the flow of heated fuel from said main passage through said recirculating passage into said fuel supply passage in response to vertical movement of said buoyant member within said main passage, said heated fuel and air conduit being connected to said upper portion of said main passage, the cross-sectional area of said main passage being sufficiently small relative to the cross-sectional area of said heated fuel and air conduit to provide for directing all of the mixture of heated fuel and entrained air around said buoyant member while the diesel engine is operating, said buoyant member being positioned within the main passage to receive the entire mixture of heated fuel and air, the buoyant member dynamically sensing the mixture of heated fuel and entrained air flowing in a turbulent condition around said buoyant member as said buoyant member responds to the proportions of heated fuel and air within the mixture while air separates from the mixture within the main passage as the air flows adjacent the buoyant member for conduction of the air to the fuel supply tank through said heated fuel and air conduit, a thermally responsive valve unit positioned within said valve body at the junction of said fuel supply passage and said fuel recirculating passage, and said thermally responsive valve unit including means for controlling the flow of heated fuel through said recirculating passage in response to the temperature of the fuel flowing through said fuel supply passage, to provide a compact valve system for efficiently using the return fuel heated by the engine as heated return fuel is quickly blended into the fuel flowing to the diesel engine from the fuel supply tank, the compact fuel control valve device requiring relatively small space adjacent the engine.

5. Apparatus for efficiently preheating diesel fuel which is supplied to a diesel engine connected to a fuel supply tank by a fuel supply passage and a fuel return passage, the apparatus comprising:

means forming a valve body defining a main passage having an upper portion and a lower portion, the main passage extending directly through the valve body, means connecting the upper portion of the main passage to the fuel return passage extending from the engine to the fuel supply tank, a connector passage connecting the lower portion of the main passage to the fuel supply passage, a movable buoyant valve member positioned for generally vertical movement within the main passage, the buoyant valve member including means for control of fluid flow through the connector passage, a mixture of air and heated return fuel being directed from the diesel engine through the fuel return passage into the main passage and into direct contact with the buoyant valve member, the buoyant valve member sensing the relative proportions of air and heated return fuel within the mixture, and separating air from the mixture of heated return fuel and air after the mixture contacts the buoyant valve member and directing the separated air through the fuel return passage to the fuel supply tank, the buoyant valve member controlling the flow of heated return fuel from the lower portion of the main passage into the fuel supply passage in response to the relative proportions of air and heated return fuel in the mixture within the main passage adjacent the buoyant valve member to provide for quickly blending the heated return fuel into the fuel supply from the fuel supply tank with minimum heat loss from the heated return fuel.

6. Apparatus for efficiently preheating diesel fuel which is supplied to a diesel engine connected to a fuel supply tank by a fuel supply passage and a fuel return passage, the apparatus comprising:

means forming a valve body defining a valve chamber having an upper portion and a lower portion, the valve chamber extending directly through the valve body, means connecting the upper portion of the valve chamber to the fuel return passage extending from the engine to the fuel supply tank, a connector passage connecting the lower portion of the valve chamber to the fuel supply passage, a movable buoyant valve member positioned for generally vertical movement within the valve chamber, the buoyant valve member including means for control of fluid flow through the connector passage, a mixture of air and heated return fuel being directed through the fuel return passage into the valve chamber and into direct contact with the buoyant valve member, the buoyant valve member sensing the relative proportions of air and heated fuel within the mixture, and separating air from the mixture of heated return fuel and air after the mixture contacts the buoyant valve member and directing the separated air through the fuel return passage to the fuel return tank, the buoyant valve member controlling the flow of heated return fuel from the lower portion of the valve chamber into the fuel supply passage in response to the relative proportions of air and heated return fuel forming the mixture within the valve chamber adjacent the valve member to provide for quickly blending the heated return fuel into the fuel supply from the fuel supply tank with minimum heat loss from the heated return fuel, and means sensing the temperature of the heated return fuel and the fuel in the fuel supply passage and controlling the flow of heated return fuel from the lower portion of the valve chamber into the fuel supply passage in response to the temperature of the heated return fuel and the fuel in the fuel supply passage.

* * * * *